(12) United States Patent
Shin (10) Patent No.: US 10,737,465 B2
(45) Date of Patent: Aug. 11, 2020

(54) INTERIOR FILM HAVING EXCELLENT METALLIC APPEARANCE EFFECT AND METHOD FOR PRODUCING THE SAME

(71) Applicant: LG Hausys, Ltd., Seoul (KR)

(72) Inventor: Jun-Beom Shin, Suwon-si (KR)

(73) Assignee: LG HAUSYS, LTD., Seoul (KR)

( * ) Notice: Subject to any disclaimer, the term of this patent is extended or adjusted under 35 U.S.C. 154(b) by 62 days.

(21) Appl. No.: 15/114,072

(22) PCT Filed: Feb. 26, 2015

(86) PCT No.: PCT/KR2015/001874
§ 371 (c)(1),
(2) Date: Jul. 26, 2016

(87) PCT Pub. No.: WO2015/130102
PCT Pub. Date: Sep. 3, 2015

(65) Prior Publication Data
US 2017/0008255 A1    Jan. 12, 2017

(30) Foreign Application Priority Data

Feb. 28, 2014   (KR) .................. 10-2014-0024578

(51) Int. Cl.
*B32B 15/08* (2006.01)
*B44C 3/02* (2006.01)
(Continued)

(52) U.S. Cl.
CPC ............... *B32B 15/08* (2013.01); *B32B 3/30* (2013.01); *B32B 7/12* (2013.01); *B32B 27/08* (2013.01);
(Continued)

(58) Field of Classification Search
CPC ....... B32B 7/12; B32B 2451/00; B32B 15/08; B32B 3/30; B32B 2255/205;
(Continued)

(56) References Cited

U.S. PATENT DOCUMENTS 4,154,896 A * 5/1979 Sattler .................. C08F 283/01
252/62
4,608,108 A * 8/1986 Goll ........................ C04B 30/02
156/181

(Continued)

FOREIGN PATENT DOCUMENTS

CN    101432098 A    5/2009
JP    S6020972 A  *  2/1985
(Continued)

OTHER PUBLICATIONS

KR 20140009934 A—Translation; Jan. 2014; Kim Ang Bae.*
(Continued)

*Primary Examiner* — Humera N. Sheikh
*Assistant Examiner* — Elizabeth D Ivey
(74) *Attorney, Agent, or Firm* — Hauptman Ham, LLP (57) ABSTRACT

The present invention relates to: an interior film in which a first ultraviolet-curable resin layer having a three-dimensional pattern formed thereon, a substrate layer, a second ultraviolet-curable resin layer having a horizontal hairline pattern formed thereon, a primer layer, and a metal layer are sequentially stacked; and a method for producing the same.

4 Claims, 4 Drawing Sheets

(51) Int. Cl.

| | | |
|---|---|---|
| *B32B 27/08* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *B32B 37/02* | (2006.01) | |
| *B32B 3/30* | (2006.01) | |
| *B32B 7/12* | (2006.01) | |
| *B32B 37/24* | (2006.01) | |
| *B32B 37/12* | (2006.01) | |
| *B32B 37/00* | (2006.01) | |

(52) U.S. Cl.
CPC ............ *B32B 27/308* (2013.01); *B32B 27/32* (2013.01); *B32B 27/36* (2013.01); *B32B 27/40* (2013.01); *B32B 37/02* (2013.01); *B44C 3/02* (2013.01); *B32B 37/0053* (2013.01); *B32B 37/12* (2013.01); *B32B 2037/243* (2013.01); *B32B 2255/10* (2013.01); *B32B 2255/26* (2013.01); *B32B 2307/402* (2013.01); *B32B 2307/406* (2013.01); *B32B 2307/41* (2013.01); *B32B 2307/712* (2013.01); *B32B 2307/732* (2013.01); *B32B 2310/0831* (2013.01); *B32B 2311/00* (2013.01); *B32B 2419/00* (2013.01); *B32B 2451/00* (2013.01); *B32B 2509/00* (2013.01)

(58) Field of Classification Search
CPC .......... B32B 2307/412; B32B 2419/00; B32B 2307/732; B32B 2509/00; B32B 2605/003; B32B 2607/02; B32B 15/085; B32B 17/10761; B32B 2310/0831; B32B 2607/00; B32B 27/00; B32B 15/088; B32B 15/18; B32B 27/38; B44C 3/02; B44C 3/025; B44C 1/24; F25D 23/02; E04B 2001/2481; E04F 13/0866; E04F 15/107; E04F 13/00; E04F 19/00; B44F 7/00; B44F 9/00; C23C 28/021

See application file for complete search history.

(56) References Cited

U.S. PATENT DOCUMENTS

| | | | | |
|---|---|---|---|---|
| 8,394,486 B2 * | 3/2013 | Hama | ................ | B44C 1/10 |
| | | | | 428/172 |
| 2003/0156080 A1 * | 8/2003 | Koike | ................ | G02B 1/116 |
| | | | | 345/60 |
| 2011/0054086 A1 * | 3/2011 | Siebecker | ........... | C08K 5/0066 |
| | | | | 524/101 |
| 2011/0123778 A1 * | 5/2011 | Kim | ................ | B44C 1/22 |
| | | | | 428/172 |

FOREIGN PATENT DOCUMENTS

| | | | | | |
|---|---|---|---|---|---|
| JP | 06-171025 | A | | 6/1994 | |
| JP | 06-312496 | A | | 11/1994 | |
| JP | 2005082691 | A | * | 3/2005 | |
| JP | 2009-208317 | A | | 9/2009 | |
| KR | 10-2010-0008582 | A | | 1/2010 | |
| KR | 1020110068435 | A | | 6/2011 | |
| KR | 1020060078530 | A | | 5/2012 | |
| KR | 20120113933 | A | * | 10/2012 | |
| KR | 20120113933 | A | * | 10/2012 | |
| KR | 1020120113933 | A | | 10/2012 | |
| KR | 10-2013-0061848 | A | | 6/2013 | |
| KR | 1020130076356 | A | | 7/2013 | |
| KR | 10-1316525 | B1 | | 10/2013 | |
| KR | 101320751 | B1 | | 10/2013 | |
| KR | 20140009934 | A | * | 1/2014 | ............ B32B 27/08 |
| KR | 1020140009934 | A | | 1/2014 | |
| WO | WO-2008038703 | A1 | * | 4/2008 | ............... B44C 1/10 |
| WO | WO-2012086944 | A2 | * | 6/2012 | ............ C09J 201/02 |

OTHER PUBLICATIONS

KR 20120113933 A—Translation;Oct. 2012; Park Ji Yong.*
Definition : Intaglio Merriam Webster On-Line Dictionary: https://www.merriam-webster.com/dictionary/intaglio; Jun. 25, 2018 (Year: 2018).*
Merriam-Webster; (definition of "intaglio"); https://www.merriam-webster.com/dictionary/intaglio;Jan. 2019 (Year: 2019).*
Bib data and translation JP2005082691; Nurishi, Seiji et al ;Mar. 2005; (Year: 2005).*
Bib Data and Translation; WO-2012086944-A2; Kim Jang-Soon et al; Jun. 2012 (Year: 2012).*
Bib Data , Translation and Derwent Abstract; JPS6020972A; Inoue et al; Feb. 1985 (Year: 1985).*
Korean Office Action dated Apr. 28, 2017 from KIPO in connection with the counterpart Korean Patent Application No. 10-2014-0024578, citing the above reference(s).
International Search Report dated May 29, 2015 corresponding to International Application PCT/KR2015/001874 citing the above reference(s).
Chinese Office Action dated Dec. 4, 2017 in connection with the counterpart Chinese Patent Application No. 201580011142.0, citing the above reference(s).

* cited by examiner

INTERIOR FILM HAVING EXCELLENT METALLIC APPEARANCE EFFECT AND METHOD FOR PRODUCING THE SAME

CROSS REFERENCE TO RELATED APPLICATION

This application claims the priority of Korean Patent Application No. 10-2014-0024578, filed on Feb. 28, 2014 in the KIPO (Korean Intellectual Property Office). Further, this application is the National Phase application of International Application No. PCT/KR2015/001874 filed Feb. 26, 2015, which designates the United States and was published in Korean.

TECHNICAL FIELD

The present invention relates to an interior film having an excellent metallic appearance and a method for producing the same.

BACKGROUND ART

There are many demands for a film having a metallic appearance effect on interior and exterior decorative materials for household appliances or buildings. Although such a film is made of a resin and thus economical and easy to handle, it gives us an impression as if it is made from a metal such as expensive stainless steel.

Typically, for this metallic effect, fine cracks should be made on a surface of the film, as those can be seen from a metal such as stainless steel, and they should reflect a shiny metallic color as if the color is generated by its natural characteristics, not merely by its coating.

For example, Korean Laid-open Patent Publication No. 2006-0078530 discloses a high glossy metallic sheet comprising a PET film having hairline patterns, under which a primer layer, an aluminum deposition layer, a urethane adhesive layer and a thermoplastic resin layer are sequentially laminated.

In conventional techniques where the hairlines, i.e., cracks, are formed by passing/scraping a surface of the film through a sandpaper roll, however, lines formed in a longitudinal film direction (also referred to herein as a machine directional hairline) can be formed, but lines formed in a film width direction (also referred to herein as a transverse or horizontal directional hairline) are difficult to form. Accordingly, the cracks or hairlines formed only in the longitudinal direction on the surface of the film lack naturalness as shown in the metal.

DISCLOSURE

Technical Problem

It is an aspect of the present disclosure to provide an interior film, which sequentially includes a first ultraviolet (UV) curable resin layer having a steric pattern (also called as a "three-dimensional pattern"), a substrate layer, a second UV curable resin layer having a transverse directional hairline pattern, a primer layer, and a metal layer.

However, it is understood that the technical challenges of the present disclosure are not limited to the above mentioned problems, and other problems which are not mentioned above will be apparent to those of ordinary skill in the art from reading the following descriptions.

Technical Solution

In accordance with one aspect of the present disclosure, there is provided an interior film, which sequentially includes a first ultraviolet (UV) curable resin layer having a steric pattern formed thereon, a substrate layer, a second UV curable resin layer having a transverse directional hairline pattern formed thereon, a primer layer, and a metal layer.

The substrate layer may include a polyesteric resin, an acrylic resin, a urethanic resin or an olefinic resin.

The substrate layer may have a thickness of 20 µm to 50 µm.

The first UV curable resin layer may be formed of a urethane acrylate oligomer.

The second UV curable resin layer may be formed of an epoxy acrylate oligomer and a urethane acrylate oligomer.

The first UV curable resin layer or the second UV curable resin layer may have a thickness of 10 µm to 30 µm.

The steric pattern of the first UV curable resin layer may include a hairline pattern and a relief or intaglio pattern.

The hairline pattern may be at least one selected from the group consisting of a longitudinal directional hairline pattern, a transverse directional hairline pattern, a multi-directional hairline pattern, a non-directional hairline pattern, and a circular hairline pattern.

The hairline pattern may have a thickness of 5 µm to 15 µm.

The relief or intaglio pattern may have a thickness of 3 µm to 20 µm.

The steric pattern of the first UV curable resin layer may be in an opposite direction of the substrate layer.

The second UV curable resin layer may have a transverse directional hairline pattern with a thickness of 5 µm to 15 µm.

The transverse directional hairline pattern of the second UV curable resin layer may be in an opposite direction of the substrate layer.

The interior film may further include an adhesive layer laminated on a lower portion of the metal layer, and a thermoplastic resin layer laminated on a lower portion of the adhesive layer.

In accordance with another aspect of the present disclosure, there is provided a method for producing an interior film, which includes preparing a substrate layer, forming a first UV curable resin layer having a steric pattern on a upper portion of the substrate layer, forming a second UV curable resin layer having a transverse directional hairline pattern on a lower portion of the substrate layer, forming a primer layer on a lower portion of the second UV curable resin layer, and forming a metal layer on a lower portion of the primer layer.

The formation of the first UV curable resin layer may include preparing a first roll on which the substrate layer is located, arranging the first roll so as not to contact with a second roll having a steric pattern formed thereon and arranging a first curing lamp positioned adjacent thereto, and supplying a first UV curable resin layer composition between the first roll and the second roll, wherein the steric pattern of the second roll is transferred to the first UV curable resin layer composition, while at least one of the first roll and the second roll is rotating.

The formation of the second UV curable resin layer may include preparing a third roll on which the substrate layer is located, arranging the third roll so as not to contact with a fourth roll having a transverse directional hairline pattern formed thereon and arranging a second curing lamp positioned adjacent thereto, and supplying a second UV curable resin layer composition between the third roll and the fourth roll, wherein the transverse directional hairline pattern of the fourth roll is transferred to the second UV curable resin layer composition, while at least one of the third roll and the fourth roll is rotating.

The method may further include forming an adhesive layer on a lower portion of the metal layer; and forming a thermoplastic resin layer on a lower portion of the adhesive layer.

Advantageous Effects

The present disclosure is capable of providing an interior film having a steric pattern and a fine and smooth transverse directional hairline pattern simultaneously using an embossed roll. Thus, the present disclosure can provide an interior film with an outer surface having a variety of three-dimensional impression, and an inner surface having a complexed fine and smooth texture, as in the case of a metal.

DESCRIPTION OF DRAWINGS

The above and other objects and features of the present disclosure will become apparent from the following description of the disclosure, when taken in conjunction with the accompanying drawings, in which.

BEST MODE

The present inventors have studied for providing an interior film having a superior metallic appearance, and eventually completed the invention by implementing a steric pattern and a transverse directional hairline pattern simultaneously using an embossed roll.

The present disclosure provides an interior film, which sequentially includes a first UV curable resin layer having a steric pattern formed thereon, a substrate layer, a second UV curable resin layer having a transverse directional hairline pattern formed thereon, a primer layer, and a metal layer.

Further, the present disclosure provides a method of producing an interior film, which includes preparing a substrate layer, forming a first UV curable resin layer having a steric pattern on a upper portion of the substrate layer, forming a second UV curable resin layer having a transverse directional hairline pattern on a lower portion of the substrate layer, forming a primer layer on a lower portion of the second UV curable resin layer, and forming a metal layer on a lower portion of the primer layer.

Hereinafter, preferred embodiments of the present disclosure will now be described in more detail with reference to the accompanying drawings so that the present disclosure can easily be practiced by those of ordinary skill in the art. The present disclosure may, however, be embodied in many different forms and should not be construed as limited to the embodiments set forth herein.

For clarity of the present specification, certain parts irrelevant to the present disclosure will be omitted in detailed description and explanation thereto. Unless otherwise specified, like reference numerals are used to refer to like elements throughout the specification.

In the drawings, thicknesses are enlarged for clarity of various layers and regions. In addition, thicknesses of some layers and regions are exaggerated for convenience of description.

It will be understood that when an element such as a layer, region or substrate is referred to as being "on" or extending "onto" another element, it can be directly on or extend directly onto the other element or intervening elements may also be present, but alternatively there are no intervening elements present.

Figure 1:
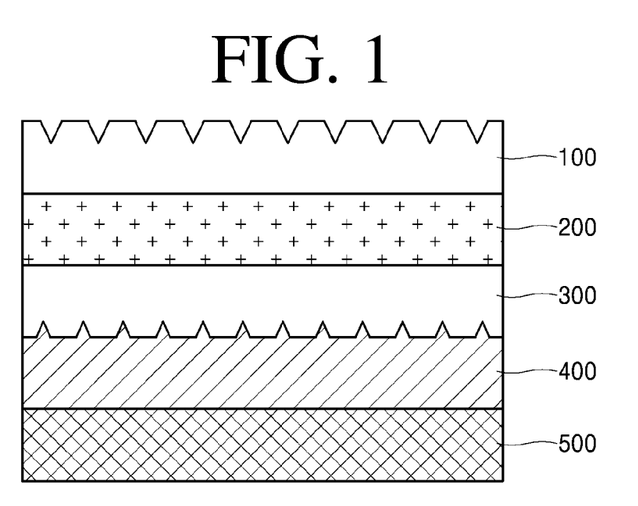
FIG. 1 shows a schematic cross-sectional view of an interior film in accordance with a first embodiment of the present disclosure.

FIG. 1 shows a schematic cross-sectional view of an interior film in accordance with a first embodiment of the present disclosure.

As shown in FIG. 1, the interior film according to a first embodiment of the present disclosure sequentially includes a first UV curable resin layer 100 having a steric pattern formed thereon, a substrate layer 200, a second UV curable resin layer 300 having a transverse directional hairline pattern formed thereon, a primer layer 400, and a metal layer 500.

Figure 2:
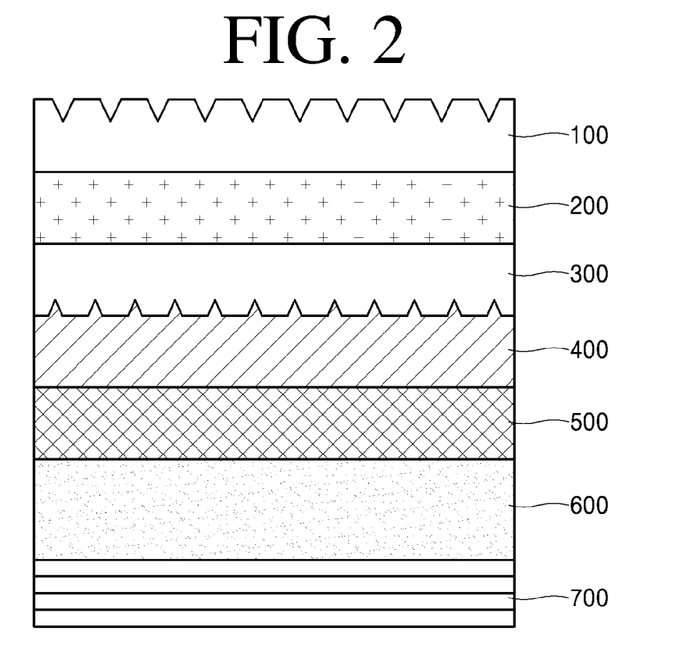
FIG. 2 shows a schematic cross-sectional view of an interior film in accordance with a second embodiment of the present disclosure.

FIG. 2 shows a schematic cross-sectional view of an interior film in accordance with a second embodiment of the present disclosure.

As shown in FIG. 2, the interior film according to a second embodiment of the present disclosure sequentially includes a first UV curable resin layer 100 having a steric pattern, a substrate layer 200, a second UV curable resin layer 300 having a transverse directional hairline pattern, a primer layer 400, a metal layer 500, an adhesive layer 600, and a thermoplastic resin layer 700.

Figure 3:
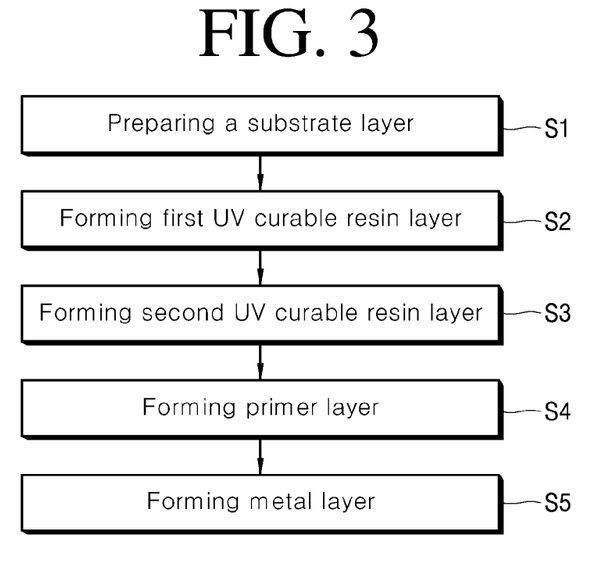
FIG. 3 illustrates a method of producing an interior film in accordance with a first embodiment of the present disclosure.

FIG. 3 illustrates a method of producing an interior film in accordance with a first embodiment of the present disclosure.

As shown in FIG. 3, a method for producing an interior film according to a first embodiment of the present disclosure includes (S1) preparing a substrate layer 200, (S2) forming a first UV curable resin layer 100 having a steric pattern on a upper portion of the substrate layer 200, (S3) forming a second UV curable resin layer 300 having a transverse directional hairline pattern on a lower portion of the substrate layer 200, (S4) forming a primer layer 400 on a lower portion of the second UV curable resin layer 300, and (S5) forming a metal layer 500 on a lower portion of the primer layer 400.

Although not shown in the drawing, the method of producing an interior film according to a second embodiment of the present disclosure may further include (S6) forming an adhesive layer 600 on a lower portion of the metal layer 500, and (S7) forming a thermoplastic resin layer 700 on a lower portion of the adhesive layer 600.

Substrate Layer 200

The substrate layer 200 may include a polyesteric resin, an acrylic resin, a urethanic resin or an olefinic resin, which are heat moldable.

The substrate layer 200 preferably includes, but is not limited to, a polyester resin such as a polyalkylene terephthalate, and more preferably a polyethylene terephthalate or a polybutylene terephthalate.

The substrate layer 200 may have a haze value of less than 10%. When the haze value of the substrate layer 200 exceeds 10%, the metal layer 500 cannot be seen through from the outside of the interior film, and thus the metallic appearance properties thereof may be inhibited.

The thickness of the substrate layer 200 is preferably in a range of 20 μm to 50 μm, but is not limited thereto. When the thickness of the substrate layer 200 is less than 20 μm, the substrate layer 200 fails to support the first UV curable resin layer 100 and is likely to break in use. In addition, when the thickness of the substrate layer 200 exceeds 50 μm, the features of the metal layer 500 laminated thereunder cannot be fully seen from the outside of the interior film.

First UV Curable Resin Layer 100

The first UV curable resin layer 100 is stacked on top of the substrate layer 200, on which a steric pattern is formed using an embossed roll suitable for a continuous process.

When a master plate is used to form the steric pattern on the first UV curable resin layer 100, it is problematic in that the master plate should be replaced depending on its contamination or lifetime. Further, it is problematic in that a connecting seam mark which corresponds to an edge of the master plate remains, and so the yield or the productivity of the interior film is decreased.

The first UV curable resin layer 100 may be formed with a urethane acrylate oligomer. In addition to the urethane acrylate oligomer, it may also be formed by using a polyfunctional acrylate monomer, a monofunctional acrylate monomer, a photoinitiator, and other additives.

The first UV curable resin layer 100 preferably has a relatively higher viscosity at 25° C. than the second UV curable resin layer 300 in terms of the formation of more uniform steric patterns, but not limited thereto. Specifically, the first UV curable resin layer 100 may have a viscosity of 700 cps to 800 cps at 25° C. When the viscosity is less than 700 cps, it is difficult to form the steric pattern. When the viscosity exceeds 800 cps, releasing defects with the roll may be caused.

The urethane acrylate oligomer may be formed by a polymerization reaction of an isocyanate-based monomer and a polyol. The isocyanate-based compound may include at least one selected from the group consisting of an aliphatic isocyanate-based compound, an aromatic isocyanate-based compound, and a combination thereof. The polyol may be a (meth)acrylic acid hydroxyalkyl ester compound.

The multi-functional acrylate monomers are intended to form a uniform steric pattern and improve a final elongation of the interior film, and include, but are not limited to, for example, bi-functional acrylates, such as 1,2-ethylene glycol diacrylate, 1,12-dodecanediol acrylate, 1,4-butanediol di(meth)acrylate, 1,6-hexanediol di(meth)acrylate, neopentyl glycol di(meth)acrylate, polyethylene glycol di(meth) acrylate, neopentyl glycol adipate di(meth)acrylate, hydroxypivalic acid neopentyl glycol di(meth)acrylate, dicyclopentanyl di(meth)acrylate, caprolactone modified dicyclopentenyl di(meth)acrylate, ethylene oxide modified di(meth)acrylate, di(meth)acryloxyethyl isocyanurate, allyl cyclohexyl di(meth)acrylate, tricyclodecane dimethanol (meth)acrylate, dimethylol dicyclopentane di(meth)acrylate, ethylene oxide modified hexahydrophthalic acid di(meth) acrylate, tricyclodecane dimethanol (meth)acrylate, neopentyl glycol modified trimethylolpropane di(meth)acrylate, adamantane di(meth)acrylate or 9,9-bis[4-(2-acrylolyloxyethoxy)phenyl]fluorine acrylate; tri-functional acrylate, such as trimethylolpropane triacrylate, trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane (meth)acrylate or tris(meth)acryloxyethyl isocyanurate; tetra-functional acrylate, such as diglycerine tetra(meth) acrylate or pentaerythritol tetra(meth)acrylate; penta-functional acrylate, such as propionic acid modified dipentaerythritol penta(meth)acrylate; and hexa-functional acrylate, such as dipentaerythritol hexa(meth)acrylate, caprolactone modified dipentaerythritol hexa(meth)acrylate or urethane (meth)acrylate (e.g., reactants of isocyanate monomer and trimethylolpropane tri(meth)acrylate).

The mono-functional acrylate monomers include, but are not limited to, butyl acrylate, hexyl acrylate, n-octyl acrylate, isooctyl acrylate, 2-ethylhexyl acrylate, isobornyl acrylate, or other (meth)acrylate-based monomers.

The photoinitiator includes a radical initiator which is commercially available in the art, such as Iracure-184 from BASF Corp., or MICURE HP-8 from Miwon Specialty Chemical Co, but not particularly limited thereto.

Specifically, the composition used in the producing of the first UV curable resin layer 100 may include 50 to 60 parts by weight of a urethane acrylate oligomer, 10 to 20 parts by weight of a polyfunctional acrylate monomer, 15 to 25 parts by weight of a monofunctional acrylate monomer, 1 to 10 parts by weight of a photoinitiator, and 1 to 10 parts by weight of other additives, based on 100 parts by weight of a solid content of the composition.

The composition used in the producing of the first UV curable resin layer 100 may include 30 to 100% by weight of the solid content. Preferably, in order to form a steric pattern corresponding to the steric pattern formed on the mold, such as an embossed roll, 100% by weight of the solid content in the composition is used. If the solid content of the composition is below the above range, the adhesion between the composition and the embossed roll becomes low such that the efficiency of forming the first UV curable resin layer 100 gets lower.

The thickness of the first UV curable resin layer 100 is preferably in a range of 10 μm to 30 μm, but not limited thereto. If the thickness of the first UV curable resin layer 100 is less than 10 μm, the adhesive force between the first UV curable resin layer 100 and the substrate layer 200 may be poor. Further, if the thickness of the UV curable resin layer 100 is greater than 30 μm, the characteristics of the metal layer 500 below may not be seen fully from the outside of the interior film.

The first UV curable resin layer 100 has a haze value of less than 10%. If the haze value of the first UV curable resin layer 100 exceeds 10%, the metal layer 500 cannot be seen from the outside of the interior film such that the metallic appearance properties of the interior film can be inhibited.

Figure 4:
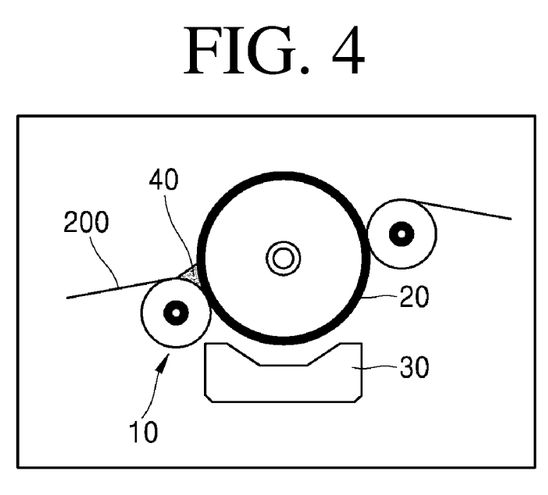
FIG. 4 illustrates a method of producing a substrate layer on which a first UV curable resin layer or a second UV curable resin layer is laminated.

The first UV curable resin layer 100 is characterized in that a steric pattern is implemented, wherein the steric pattern is formed in a reversed image against the convex parts of the second roll 20.

The steric pattern of the first UV curable resin layer 100 may be disposed opposite the substrate layer 200.

The steric pattern of the first UV curable resin layer 100 may include a hairline pattern and a relief or intaglio pattern.

The hairline pattern may be at least one selected from the group consisting of a longitudinal directional hairline pattern, a transverse directional hairline pattern, a multi-directional hairline pattern, a non-directional hairline pattern, and a circular hairline pattern.

In this case, as used herein, the term "longitudinal directional hairline pattern" means that a pattern angle to the longitudinal direction of the film (also referred to herein as "lengthwise direction of the film" or "machine direction of the film") is less than that to the transverse direction of the film. Meanwhile, as used herein, the term "transverse directional hairline patter" means that a pattern angle to the longitudinal direction of the film (also referred to herein as "lengthwise direction of the film," "machine direction of the film," or "horizontal direction of the film") is greater than that to the transverse direction of the film.

The thickness of the hairline pattern may be within a range of 5 μm to 15 μm. In this case, when the thickness of the hairline pattern is less than 5 μm, fine cracks are not satisfactorily observed on the metal surface, and thus the hairline effect is not explicitly implemented, thereby making difficult to achieve a metallic impression as intended in the present disclosure. In addition, when the thickness of the hairline pattern exceeds 15 μm, a similarity to cracks, i.e., hairline, on a typical metal surface is low, and thus it is also difficult to implement a metallic impression as intended in the present disclosure, and during winding of the film, marks are likely to be transferred toward the substrate layer, whereby a finished article may have poor properties.

The relief or intaglio pattern may include at least one selected from the group consisting of a fine uneven pattern, a mirror pattern, an etching pattern, a vibration pattern, and a bead blast pattern.

The thickness of the relief or intaglio pattern may be within a range of 3 μm to 20 μm. In this case, when the thickness of the relief or intaglio pattern is less than 3 μm, it is difficult to implement a metallic impression as intended in the present disclosure. In addition, when the thickness of the relief or intaglio pattern exceeds 20 μm, it is also difficult to implement a metallic impression as intended in the present disclosure, and during winding of the film, marks are likely to be transferred toward the substrate layer, whereby a finished article may have poor properties.

That is, the relief or intaglio pattern may have a wider range of thickness compared to the hairline pattern for implementing the hairline effect only. Thus, various effects, such as etching effect, three-dimensional effect or irregular reflection effect can be obtained.

The formation of the first UV curable resin layer 100 may include preparing a first roll 10 on which the substrate layer 200 is located, arranging the first roll 10 so as not to contact with a second roll 20 having a steric pattern thereon, arranging a first curing lamp 30 positioned adjacent thereto, and supplying a first UV curable resin layer composition 40 between the first roll 10 and the second roll 20, wherein the steric pattern of the second roll 20 is transferred to the first UV curable resin layer composition 40, while at least one of the first roll 10 and the second roll 20 is rotating.

More specifically, the step of preparing a first roll 10 on which the substrate layer 200 is located may include placing the substrate layer 200 on a portion or whole of the surface of the first roll 10. In this case, at least a portion of the substrate layer 200 is laid over the first roll 10, while the rest of the substrate layer 200 is enforced to follow toward the first roll 10.

The steps of arranging the first roll 10 so as not to contact with a second roll 20 having a steric pattern thereon and arranging a first curing lamp 30 positioned adjacent thereto are previous steps for forming and curing the steric pattern on the surface of the first UV curable resin layer composition 40. In this case, the first roll 10 is arranged at a position not in contact with the second roll 20 on which the steric pattern is formed, since the first UV curable resin layer composition 40 should be supplied between the first roll 10 and the second roll 20. Therefore, the distance of the first roll 10 and the second roll 20 is determined depending on the thickness of the first UV curable resin layer 100, which is appropriately adjustable by a person of ordinary skill in the art, if necessary. The second roll 20 has a steric pattern formed thereon, wherein the steric pattern is intended to from a steric pattern in reversed image on the first UV curable resin layer 100. That is, there is formed a concave portion on the first UV curable resin layer 100 in response to a convex portion of the second roll 20. The first curing lamp 30 refers to an ultraviolet lamp for curing the first UV curable resin layer composition 40 supplied between the first roll 10 and second roll 20. The first curing lamp 30 is disposed at a position adjacent to the first roll 10 and the second roll 20, wherein it is preferably disposed in an opposite direction to a direction at which the first UV curable resin layer composition 40 is fed based on the first roll 10 or the second roll 20.

The step of S203 of supplying the first UV curable resin layer composition 40 between the first roll 10 and the second roll 20, wherein the steric pattern of the second roll 20 is transferred to the first UV curable resin layer composition 40, while at least one of the first roll 10 and the second roll 20 is rotating is a step of preparing the substrate layer 200 on which the first UV curable resin layer 100 having a steric pattern formed thereon is laminated. In the step of S203, the supplied UV curable resin layer is laminated on an upper portion of the substrate layer 200 while passing through between the first roll 10 and the second roll 20, and at the same time a steric pattern is transferred and cured on a surface of the UV curable resin. That is, a steric pattern of the second roll 20 is transferred on the UV curable resin, and at the same time the UV curable resin layer 100 is formed on top of the substrate layer 200. Preferably, the first roll 10 and the second roll 20 are both rotating.

The formation of the first UV curable resin layer 100 may further include a secondary curing of the substrate layer 200 on which the first UV curable resin layer 100 is laminated, prepared from the step of transferring the steric pattern of the second roll 20 to the first UV curable resin layer composition 40, using a separate curing lamp. The physical properties of the first UV curable resin layer composition become more stable by the secondary curing step.

In this case, the primary curing may be carried out by irradiation of UV radiation in a light quantity of 10 to 100 $mJ/cm^2$, and the secondary curing may be carried out by irradiation of UV radiation in a light quantity of 200 to 400 $mJ/cm^2$.

Second UV Curable Resin Layer 300

The second UV curable resin layer 300 is stacked on top of the substrate layer 200, on which a transverse directional hairline pattern is formed using an embossed roll suitable for a continuous process.

When a master plate is used to form the transverse directional hairline pattern on the second UV curable resin layer 300, it is problematic in that the master plate should be replaced depending on its contamination or lifetime. Further, it is problematic in that a connecting seam mark which correspond to an edge of the master plate remains, and so the yield or the productivity of the interior film is decreased.

The second UV curable resin layer 300 may be formed with an epoxy acrylate oligomer and a urethane acrylate oligomer. In addition to the epoxy acrylate oligomer and the urethane acrylate oligomer, it may also be formed by using a monofunctional acrylate monomer, a monofunctional reactive monomer, a photoinitiator, and other additives.

The second UV curable resin layer 300 preferably has a relatively lower viscosity at 25° C. than the first UV curable resin layer 100 in terms of the formation of more uniform transverse directional hairline patterns, but not limited thereto. Specifically, the second UV curable resin layer 300 may have a viscosity of 600 cps to 700 cps at 25° C. When the viscosity is less than 600 cps, it is difficult to form the transverse directional hairline pattern. When the viscosity exceeds 700 cps, releasing defects with the roll may be caused.

The epoxy acrylate oligomer may include at least one selected from the group consisting of bisphenol A diglycidyl ether, hydrogenated bisphenol A diglycidyl ether, (meth) acrylic acid adduct of phenol novolac epoxy resin, and combinations thereof. The urethane acrylate oligomer may include those as mentioned in the first UV curable resin layer 100. In this case, the epoxy acrylate oligomer is preferably used in combination with the urethane acrylate oligomer, rather than used alone.

The mono-functional acrylate monomers include, but are not limited to, butyl acrylate, hexyl acrylate, n-octyl acrylate, isooctyl acrylate, 2-ethylhexyl acrylate, isobornyl acrylate, or other (meth)acrylate-based monomers.

The mono-functional reactive monomers may include, but are not limited to, tetrahydrofurfuryl alcohol and the like.

The photoinitiator includes a radical initiator which is commercially available in the art, such as Iracure-184 from BASF Corp., or MICURE HP-8 from Miwon Specialty Chemical Co, but not particularly limited thereto.

Specifically, the composition used in the producing of the second UV curable resin layer 300 may include 20 to 40 parts by weight of epoxy acrylate oligomer, 15 to 25 parts by weight of a urethane acrylate oligomer, 5 to 15 parts by weight of a monofunctional acrylate monomer, 15 to 25 parts by weight of monofunctional reactive monomer, 1 to 10 parts by weight of a photoinitiator, and 1 to 10 parts by weight of other additives, based on 100 parts by weight of a solid content of the composition.

More specifically, the epoxy acrylate oligomer may constitute 20 to 40 parts by weight based on 100 parts by weight of a solid content of the composition. In this case, when the epoxy acrylate oligomer is less than 20 parts by weight, the effect of the combination use is insignificant, while when the epoxy acrylate oligomer exceeds 40 parts by weight, interlayer adhesion and discoloration problems are typically encountered.

The composition used in the producing of the second UV curable resin layer 300 may include 30 to 100% by weight of the solid content. Preferably, in order to form a steric pattern corresponding to the steric pattern formed on the mold, such as an embossed roll, 100% by weight of the solid content in the composition without adding a solvent is used.

The thickness of the second UV curable resin layer 300 is preferably in a range of 10 μm to 30 μm, but not limited thereto. If the thickness of the second UV curable resin layer 300 is less than 10 μm, the adhesive force between the second UV curable resin layer 300 and the substrate layer 200 may be poor. Further, if the thickness of the second UV curable resin layer 300 is greater than 30 μm, the characteristics of the metal layer 500 below may not be seen fully from the outside of the interior film.

The second UV curable resin layer 300 has a haze value of less than 10%. If the haze value of the second UV curable resin layer 300 exceeds 10%, the metal layer 500 cannot be seen from the outside of the interior film such that the metallic appearance properties of the interior film can be inhibited.

The second UV curable resin layer 300 is characterized in that a transverse directional hairline pattern is implemented, wherein the transverse directional hairline pattern is formed in a reversed image against the convex parts of the second roll 20.

The transverse directional hairline pattern in the second UV curable resin layer 300 may be disposed opposite the substrate layer 200.

Preferably, the thickness of the transverse directional hairline pattern in the second UV curable resin layer 300 is in a range of 5 μm to 15 μm, but not limited thereto. In this case, when the thickness of the transverse directional hairline pattern is less than 5 μm, the effect of the hairline cannot be clearly achieved, and fine cracks cannot be satisfactorily observed on the metal surface, thereby making difficult to achieve a metallic impression as intended in the present disclosure. In addition, when the thickness of the transverse directional hairline pattern exceeds 15 μm, a similarity to cracks, i.e., hairline, on a typical metal surface is low, and thus it is also difficult to implement a metallic impression as intended in the present disclosure, and during winding of the film, marks are likely to be transferred toward the substrate layer, whereby a finished article may have poor properties.

The formation of the second UV curable resin layer 300 may include preparing a third roll 10 on which the substrate layer 200 is located, arranging the third roll 10 so as not to contact with a fourth roll 20 having a transverse directional hairline pattern thereon, arranging a second curing lamp 30 positioned adjacent thereto, and supplying a second UV curable resin layer composition 40 between the third roll 10 and the fourth roll 20, wherein the transverse directional hairline pattern of the fourth roll 20 is transferred to the second UV curable resin layer composition 40, while at least one of the third roll 10 and the fourth roll 20 is rotating.

More specifically, the step of preparing a third roll 10 on which the substrate layer 200 is located may include placing the substrate layer 200 on a portion or whole of the surface of the third roll 10. In this case, at least a portion of the substrate layer 200 is laid over the third roll 10, while the rest of the substrate layer 200 is enforced to follow toward the third roll 10.

The steps of arranging the third roll 10 so as not to contact with a fourth roll 20 having a transverse directional hairline pattern formed thereon and arranging a second curing lamp 30 positioned adjacent thereto are previous steps for forming and curing the transverse directional hairline pattern on the surface of the second UV curable resin layer composition 40. In this case, the third roll 10 is arranged at a position not in contact with the fourth roll 20 on which the transverse directional hairline pattern is formed, since the second UV curable resin layer composition 40 should be supplied between the third roll 10 and the fourth roll 20. Therefore, the distance of the third roll 10 and the fourth roll 20 is determined depending on the thickness of the second UV curable resin layer 300, which is appropriately adjustable by a person of ordinary skill in the art, if necessary. The fourth roll 20 has a transverse directional hairline pattern formed thereon, wherein the transverse directional hairline pattern is intended to from a transverse directional hairline pattern in reversed image on the second UV curable resin layer 300. That is, there is formed a concave portion on the second UV curable resin layer 300 in response to a convex portion of the fourth roll 20. The curing lamp 30 refers to an ultraviolet lamp for curing the second UV curable resin layer composition 40 supplied between the third roll 10 and the fourth roll 20. The curing lamp 30 is disposed at a position adjacent to the third roll 10 and the fourth roll 20, wherein it is preferably disposed in an opposite direction to a direction at which the second UV curable resin layer composition 40 is fed based on the third roll 10 or the fourth roll 20.

The step of S203 of supplying the second UV curable resin layer composition 40 between the third roll 10 and the fourth roll 20, wherein the transverse directional hairline pattern of the fourth roll 20 is transferred to the second UV curable resin layer composition 40, while at least one of the third roll 10 and the fourth roll 20 is rotating is a step of preparing the substrate layer 200 on which the second UV curable resin layer 100 having the transverse directional hairline pattern formed thereon is laminated. In the step of S203, the supplied UV curable resin layer is laminated on an upper portion of the substrate layer 200 while passing through between the third roll 10 and the fourth roll 20, and at the same time the transverse directional hairline pattern is transferred and cured on a surface of the UV curable resin. That is, the transverse directional hairline pattern of the fourth roll 20 is transferred on the UV curable resin, and at the same time the UV curable resin layer 300 is formed on a bottom of the substrate layer 200. Preferably, the third roll 10 and the fourth roll 20 are both rotating.

The formation of the second UV curable resin layer 300 may further include a secondary curing of the substrate layer 200 under which the second UV curable resin layer 300 is laminated, prepared from the step of transferring the transverse directional hairline pattern of the fourth roll 20 to the second UV curable resin layer composition 40, using a separate curing lamp. The physical properties of the second UV curable resin layer composition become more stable by the secondary curing step.

In this case, the primary curing may be carried out by irradiation of UV radiation in a light quantity of 10 to 100 mJ/cm$^2$, and the secondary curing may be carried out by irradiation of UV radiation in a light quantity of 200 to 400 mJ/cm$^2$.

Primer Layer 400

The primer layer 400 is located between the second UV curable resin layer 300 and the metal layer 500, thereby increasing the adhesive strength of the second UV curable resin layer 300 and the metal layer 500. The primer layer 400 may include an acrylic, an acrylic urethane-based, an epoxy-based, a polyurethane-based, a polyisocyanate-based, a polyester-based, an acrylate-based, an ethylene-vinyl acetate copolymer, a polyamide-based, a melamine-based, a synthetic rubber, or a polyvinyl alcohol-based resin. The primer layer 400 may be formed on a lower portion of the second UV curable resin layer 300 using a known method such as a gravure coating method. The lower portion of the second UV curable resin layer 300 refers to an opposite direction relative to the substrate layer 200 based on the second UV curable resin layer 300.

The primer layer 400 can have a controlled thickness by changing a viscosity of the solution of the resin. The thickness is preferably formed in a range of 1 μm to 5 μm. When the thickness of the primer layer 400 is within a range of 1 μm to 5 μm, the adhesive strength of the second UV curable resin layer 300 and the metal layer 500 can satisfactorily be increased, and the thickness of the film does not become too thick more than necessary.

Metal Layer 500

The metal layer 500 is formed by depositing a metal on the bottom of the primer layer 300. The metal layer 500 may be formed by a general vacuum thermal deposition method, a sputtering method, or the like. For example, in the case of the vacuum thermal deposition method, the vacuum deposition may be conducted under 10$^{-4}$ Torr to 10$^{-6}$ Torr and at a temperature of 300° C. to 800° C. In the case of the sputtering method, the metal is dissociated as fine metal nanoparticles under plasma state, allowing the metal nanoparticles to coat on a bottom of the primer layer 400. The metal deposition may be carried out to coat the layer in a thickness of about 0.70 OD (Optical Density), but the deposition method is not particularly limited thereto. The metal may include, but is not limited to, gold, silver, cobalt, aluminum, iron, nickel, chromium, copper, tin, stainless steel, and the like, with aluminum preferred. The metal layer 500 of the present disclosure may be formed by selecting a suitable metal, depending on metal texture to be implemented by those of ordinary skill in the art. The metal layer 500 can be perceived from the exterior of the film through the first UV curable resin layer 100, the substrate layer 200, the second UV curable resin layer 300, and the primer layer 400. The metal layer 500 allows the film of the present disclosure to achieve a more similar metallic texture and develop a metallic color impression.

The metal layer 500 may be formed with a thickness of 100 nm to 1000 nm. When the thickness of the metal layer 500 is less than 100 nm, it is difficult to detect the metallicity from the outside of the film, whereas when the thickness of the metal layer 500 is greater than 1000 nm, it becomes more expensive than necessary.

The metal layer 500 may be a single metal thin layer or a multi-layer structured metal thin layer, wherein the use of the multi-layer structured metal thin layer where a plurality of metal thin layers is deposited is preferred in achieving a metallic texture exhibiting various colors and high brightness than the use of the single metal thin layer.

Adhesive Layer 600

The adhesive layer 600 may be laminated on a bottom of the metal layer 500. The adhesive layer 600 is used to attach the interior film to an adherend. The adherend may be a plate, such as electronics.

The adhesive layer 600 may be formed using an adhesive such as polyurethane or polyester. The adhesive layer 600 may be formed with a thickness 5 μm to 10 μm by a comma coating method. It is possible to produce a more vivid three-dimensional impression by forming the adhesive layer 600 as an opaque layer. In addition, the adhesive layer 600 may also be applied by a micro gravure coating method. In certain embodiments of the present disclosure, when the adhesive layer is formed as an opaque layer, a pigment may be added to an adhesive composition constituting the adhesive layer.

Thermoplastic Resin Layer 700

The thermoplastic resin layer 700 is intended to act as a buffer when attached to an adherend, and may include, but is not limited to, a polyvinyl chloride-based resin, a polyolefin-based resin including a polypropylene, a polystyrene-based resin, a polyester-based resin including a polyethylene terephthalate or a polybutylene terephthalate, and an engineering plastic including a polyimide or a polysulfone.

The thermoplastic resin layer 700 may be formed with a thickness of 70 nm to 100 nm to further protect the metal layer 500 and supplement a weather resistance and durability.

In this way, the interior film showing a three-dimensional embossed effect according to the present disclosure may be prepared by laminating the thermoplastic resin layer 700 to a bottom of the adhesive layer 600 through a lamination roll by applying a heat of 80° C. to 150° C. The film can subsequently be adhered to an iron plate, wood, a building wall, etc. by applying an adhesive thereto, and can then be applied to the exterior materials such as for household appliances and the decorative finishing materials such as for inside and outside the building and furniture.

The interior film according to the present disclosure is capable of implementing a steric pattern using an embossed roll and at the same time providing a fine and smooth transverse directional hairline pattern, thereby giving an impression as if the film is made of a metal.

Hereinafter, preferred Examples of the present disclosure will now be described to provide a further understanding of the present disclosure. However, it should be noted that while the preferred examples are listed for easy understanding of the contents of the present disclosure, the present disclosure is not limited to these examples.

EXAMPLE

Example 1

A first UV curable resin composition was prepared from 100% by weight of a solid content of an acrylate resin composition (viscosity=750 cps at 25° C.) comprising 55 parts by weight of hexa-functional urethane acrylate oligomer (Sartomer EMEA, CN9125), 15 parts by weight of trimethylolpropane triacrylate, 20 parts by weight of isobornyl acrylate, 8 parts by weight of photoinitiator (Iracure-184, BASF), 1 part by weight of silica matting agent, and 1 part by weight of UV stabilizer (Tinuvin 234, BASF), relative to 100 parts by weight of a solid content of the composition.

Further, a second UV curable resin composition was prepared from 100% by weight of a solid content of an acrylate resin composition (viscosity=600 cps at 25° C.) comprising 32 parts by weight of epoxy acrylate oligomer (Sartomer EMEA, CN104), 20 parts by weight of hexa-functional urethane acrylate oligomer (Sartomer EMEA, CN9125), 10 parts by weight of isobornyl acrylate, 20 parts by weight of tetrahydrofurfuryl alcohol, 8 parts by weight of hydroxy dimethyl acetophenone as photoinitiator (MICURE HP-8, Miwon Specialty Chemical), and 10 parts by weight of epoxy diluent (BGE), relative to 100 parts by weight of a solid content of the composition.

A highly transparent PET sheet having a haze of 6%, a light transmittance of 92% or more, a gloss of 160%, and a thickness of 30 μm was prepared, and then the prepared PET sheet was placed on a first roll. The first roll was disposed near a second roll on which steric patterned convex portions including a hairline pattern having a thickness of 10 μm and a relief or intaglio pattern having a thickness of 10 μm were formed, and a UV lamp was placed in a position adjacent thereto. The first UV curable resin layer composition was fed between the first roll and the second roll, while at the same time a primary curing was conducted at 50 mJ/cm$^2$ with the UV lamp. Then, the first UV curable resin layer cured in the primary curing was further cured in a secondary curing at 300 mJ/cm$^2$ with a separate UV lamp to form a first UV curable resin layer having the steric pattern formed thereon and having a thickness of 10 μm on top of the PET sheet. The PET sheet on which the first UV curable resin layer was formed was placed on a third roll. The third roll was disposed near a fourth roll on which transverse directional hairline patterned convex portions having a thickness of 10 μm were formed, and a UV lamp was placed in a position adjacent thereto. The second UV curable resin layer composition was fed between the third roll and the fourth roll, while at the same time a primary curing was conducted at 50 mJ/cm$^2$ with the UV lamp. Then, the second UV curable resin layer cured in the primary curing was further cured in a secondary curing at 300 mJ/cm$^2$ with a separate UV lamp to form a second UV curable resin layer having the transverse directional hairline pattern formed thereon and having a thickness of 10 μm on bottom of the PET sheet. After completion of drying, a primer layer having a thickness of 1 μm was formed on bottom of the second UV curable resin layer by a gravure coating method with an acrylic resin. Then, an aluminum deposition layer having a thickness of 600 nm was formed on bottom of the primer layer through a vacuum deposition at 10$^{-4}$ Torr and at 760° C., and then a polyester adhesive layer was formed on bottom of the aluminum deposition layer by applying with a thickness of 10 μm through a comma coater method. After completion of drying, a polyvinyl chloride-based resin was laminated on bottom of the polyester adhesive layer through a lamination roll by applying a heat of 100° C., to thereby prepare an interior film.

The interior film prepared in Example 1 is capable of implementing a steric pattern on the surface of the first UV curable resin layer using an embossed roll, while at the same time implementing a fine and smooth transverse directional hairline pattern (elongated cracks) on the surface of the second UV curable resin layer using a separate embossed roll, to impart a desired shiny metallic color impression, such that although the film is essentially a resin film, it feels like a stainless steel.

While the preferred examples of the invention have been shown and described, it should be understood that various substitutions, modifications and variations may be made by those of ordinary skill in the art without departing from the spirit or scope of the disclosure. Accordingly, all such modifications and variations are included in the scope of the invention as defined by the following claims.

INDUSTRIAL APPLICABILITY

The present invention provides an interior film having excellent metallic appearance.

The invention claimed is:
1. An interior film, sequentially comprising:
a first ultraviolet (UV) curable resin layer having a steric pattern, wherein the steric pattern comprises a first hairline pattern and a relief or intaglio pattern, wherein the first UV curable resin layer is a cured product of a first UV curable resin layer composition having a viscosity ranging from 700 cps to 800 cps at 25° C., and wherein the first UV curable resin layer is formed of a urethane acrylate oligomer, a polyfunctional acrylate monomer and a monofunctional acrylate monomer;
a substrate layer;
a second UV curable resin layer having a second hairline pattern, wherein the second UV curable resin layer is a cured product of a second UV curable resin layer composition having a viscosity ranging from 600 cps to 700 cps at 25° C., and wherein the second UV curable resin layer is formed of an epoxy acrylate oligomer, a urethane acrylate oligomer, a monofunctional acrylate monomer and a monofunctional reactive monomer;
a primer layer; and
a metal layer, wherein a thickness of the metal layer ranges from 600 nm to 1000 nm,
wherein the first hairline pattern has a thickness ranging from 5 μm to 15 μm,
wherein the relief or intaglio pattern has a thickness ranging from 3 μm to 20 μm,
wherein the first UV curable resin layer comprises the steric pattern on a surface opposite to a surface in contact with the substrate layer,
wherein the second UV curable resin layer comprises the second hairline pattern on a surface opposite to a surface in contact with the substrate layer, wherein the primer layer comprises a corresponding pattern that engages the second hairline pattern on a surface in contact with the second UV curable resin layer, wherein the second hairline pattern is a transverse directional hairline pattern, wherein the first UV curable resin layer and the second UV curable resin layer have no connecting seam mark which corresponds to an edge of a master plate, wherein the substrate layer has a thickness of 20 μm to 50 μm and a haze value of less than 10%, wherein the first UV curable resin layer has a thickness of 10 μm to 30 μm and a haze value of less than 10%, wherein the second UV curable resin layer has a thickness of 10 μm to 30 μm and a haze value of less than 10%, wherein the second hairline pattern has a thickness of 5 μm to 15 μm, wherein the transverse directional hairline pattern is defined by a plurality of second hairlines, and an angle between each second hairline of the plurality of second hairlines and a longitudinal direction of the interior film is greater than an angle between the corresponding second hairline and a transverse direction of the interior film, and wherein the viscosity of the first UV curable resin layer composition is higher than the viscosity of the second UV curable resin layer composition.

2. The interior film of claim 1, wherein the substrate layer comprises a polyesteric resin, an acrylic resin, a urethanic resin or an olefinic resin.

3. The interior film of claim 1, wherein the first hairline pattern comprises at least one selected from the group consisting of a longitudinal directional hairline pattern, a transverse directional hairline pattern, a multi-directional hairline pattern, a non-directional hairline pattern, and a circular hairline pattern, wherein the longitudinal directional hairline pattern is defined by a plurality of first hairlines, and an angle between each first hairline of the plurality of first hairlines and the longitudinal direction of the interior film is less than an angle between the corresponding first hairline and the transverse direction of the interior film.

4. The interior film of claim 1, further comprising an adhesive layer laminated on a lower portion of the metal layer, and a thermoplastic resin layer laminated on a lower portion of the adhesive layer.

* * * * *